United States Patent [19]

Severson

[11] 4,243,019
[45] Jan. 6, 1981

[54] LIGHT-WEIGHT-TROUGH TYPE SOLAR CONCENTRATOR SHELL

[75] Inventor: Asbjorn M. Severson, Hennepin County, Minn.

[73] Assignee: Honeywell Inc., Minneapolis, Minn.

[21] Appl. No.: 954,711

[22] Filed: Oct. 25, 1978

[51] Int. Cl.$^3$ ................................................. F24J 3/02
[52] U.S. Cl. .................................... 126/438; 350/293; 350/294
[58] Field of Search ................. 126/438; 350/293, 294

[56] References Cited

U.S. PATENT DOCUMENTS

| | | | |
|---|---|---|---|
| 3,058,394 | 10/1962 | Edlin . | |
| 3,645,606 | 2/1972 | La Vantine . | |
| 3,841,738 | 10/1974 | Caplan | 126/438 |
| 4,026,273 | 5/1977 | Parker . | |
| 4,038,971 | 8/1977 | Bezborodko . | |
| 4,106,480 | 8/1978 | Lyon et al. | 126/438 |

*Primary Examiner*—Carroll B. Dority, Jr
*Attorney, Agent, or Firm*—Charles G. Mersereau

[57] ABSTRACT

A parabolic cylindrical trough solar concentrator shell is disclosed having a pair of oppositely disposed end support members jointed by spanning structural support members which may be in the form of individual elongated generally triangular polygon members to form the parabolic cylindrical trough. The inwardly directed surface of each polygon member is concave in shape and rendered highly reflective and so disposed such that the composite produces a highly reflective, concave, generally parabolic surface which reflects and focusses radiant energy striking upon it along a line parallel to and above the surface of the trough. A radiant energy receiving and absorbing conduit which carries a fluid heat transfer medium is provided along the focal line. The conduit is structurally supported from the end support members in a manner which allows free rotation of the structure relative to the support. In addition to the composite triangular polygon members, the structure may be fabricated using other shapes or a spanning sheet corrugated for strength covered by a separate reflecting surface.

4 Claims, 6 Drawing Figures

LIGHT-WEIGHT-TROUGH TYPE SOLAR CONCENTRATOR SHELL

BACKGROUND OF THE INVENTION

1. Field of the Invention

The present invention relates broadly to the field of solar energy utilization and, more particularly, to an inexpensive, easily fabricated structurally strong, parabolic trough solar concentrating absorber shell.

2. Description of the Prior Art

Rapid depletion of the conventional sources of energy has resulted in a ever widening search for alternatives to such conventional sources as petroleum and natural gas to meet the increasing demand for energy by our society today. One such viable source which is commanding a great deal of attention in research and development and in the deployment of experimental units is, of course, that of solar energy. Solar collectors may be employed, inter alia, as sources of heat for homes and buildings and for maintaining an adequate supply of hot water in such installations.

Generally, the prior art contains many different examples of ways to utilize the solar energy absorbed by concave collector systems in which the raidant energy is reflective from a concave surface onto an absorbing receiver of one variety or another. It is known that a general parabolic-shaped trough will reflect sunlight such that it can be focussed along a line parallel to and above the trough. The location of an absorbing member such as a pipe containing heat transfer fluid along the line of such reflection has been used to heat water or the like in installations of this type.

One example of prior art is contained in a Patent to Parker, U.S. Pat. No. 4,026,273 issued May 31, 1977, which illustrates and describes a solar fluid heater which includes a radiation trap for concentrating solar radiation focussing the solar radiation on the transparent pipe located above the curve of the concentrator and, in turn, heating the fluid in the pipe. An additional reference is contained in a patent to La Vantine, U.S. Pat. No. 3,645,606 issued Feb. 29, 1972, which discloses a light-reflecting concentrator having substantially paraboloidal surface which is formed of a plurality of juxtaposed facets, each facet also having a generally paraboloidal surface. The device is utilized to focus light received on the parabolic surface to a point above the surface where it can be utilized. The invention utilizes two paraboloidal radii on a orthogonal planes in each of said facets and the columnated light can be used as a solar simulator. It is not, however, on the scale of a solar collector.

SUMMARY OF THE INVENTION

According to the present invention, there is provided a light weight trough-type solar concentrator shell wherein structural members defining the generally parabolic surface also provide the structural support for the structure. The parabolic surface may be made up of a plurality of juxtaposed structural shapes which form a composite surface or by a corrugated or similar shaped continuous member which in conjunction with an additional surface layer forms a parabolic surface and also provides inherent strength in supporting the trough along its length. End support sections are provided with recesses defining the parabolic shape of the trough and also supporting the lateral structural members. A solar energy receiving and absorbing heat transfer member is provided along the length of the trough at the focal point of the parabolic surface such that the radiant energy received by the parabolic surface is reflected along the line of the absorber member and transferred to fluid internal of the absorber member. Means are provided to support the absorber member from the end support member of the solar collector parabolic trough and bearing surfaces are provided such that the conduit or absorber member may rotate freely relative to the trough structure. Since the structural members are utilized to define the generally parabolic curved surface, the need for additional structural members is eliminated. Also, the entire structure may be made of light-weight structural members such as aluminum, or the like, thereby also reducing the amount of total material and structural support required for the system.

BRIEF DESCRIPTION OF THE DRAWING

In the drawings, wherein like numerals are used to designate like parts throughout the same.

DESCRIPTION OF THE PREFERRED EMBODIMENT

Figure 1:
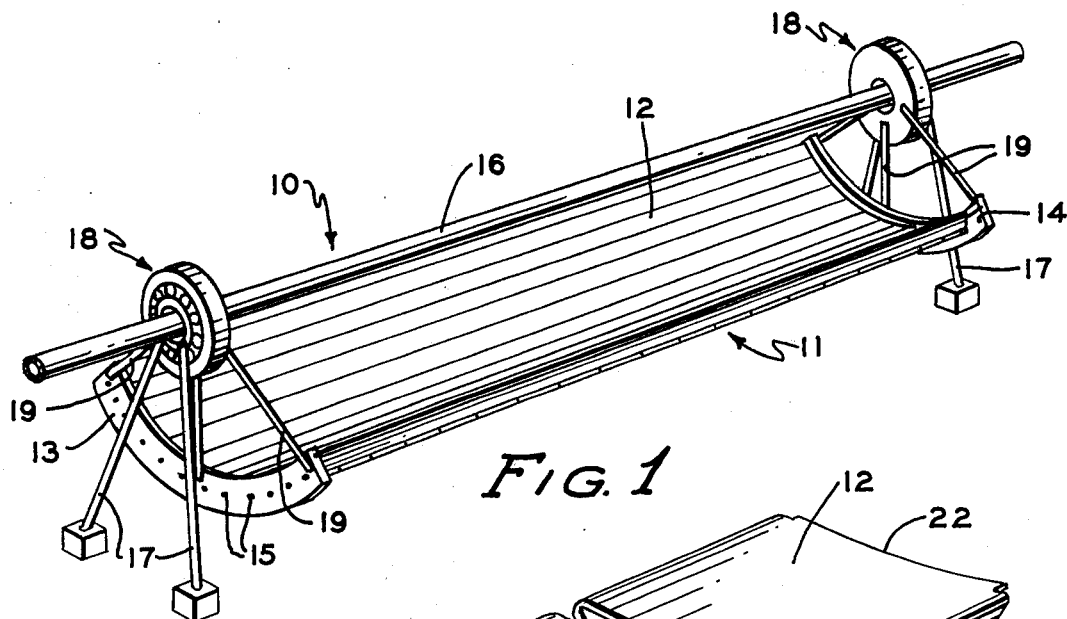
FIG. 1 is a perspective view of the parabolic trough-type solar collector shell of the invention.

In FIG. 1, there is shown generally at 10 the trough-type solar collector of the present invention. This includes an elongated trough structure 11 which has a plurality of elongated structural members 12 which span end plates 13 and 14. The members 12 are fixed in place as by tensioning rods 15. A solar receiver and absorber heat transfer conduit 16 is provided. The collector trough structure 11 is further rotatably mounted on support members 17 as by becoming collar 18 connected by struts 19 to end plate 18 and 14 such that the structure is free to pivot relative to the support. The conduit 16 may be independently supported.

Figure 2:
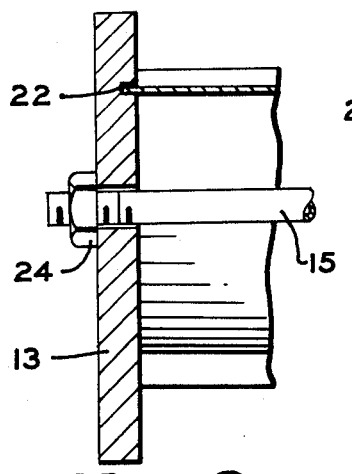
FIG. 2 is an enlarged fragmentary, broken view of one of the elongated structural members of FIG. 1.
Figure 3:
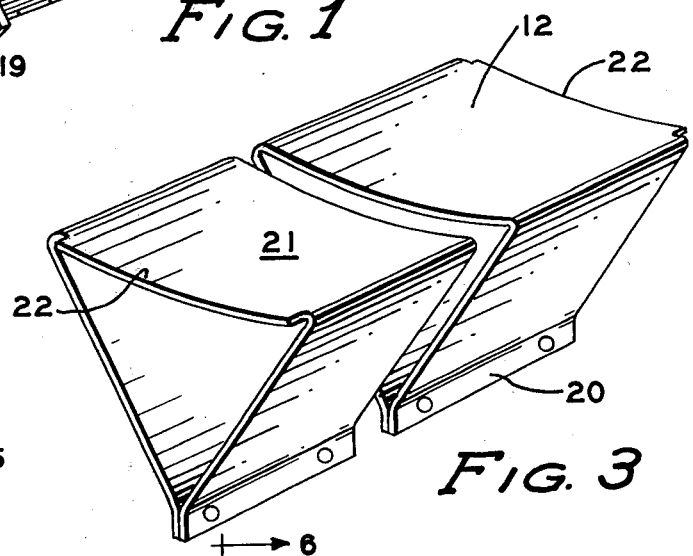
FIG. 3 is an enlarged fragmentary view depicting the mounting of the structural members.
Figure 4:
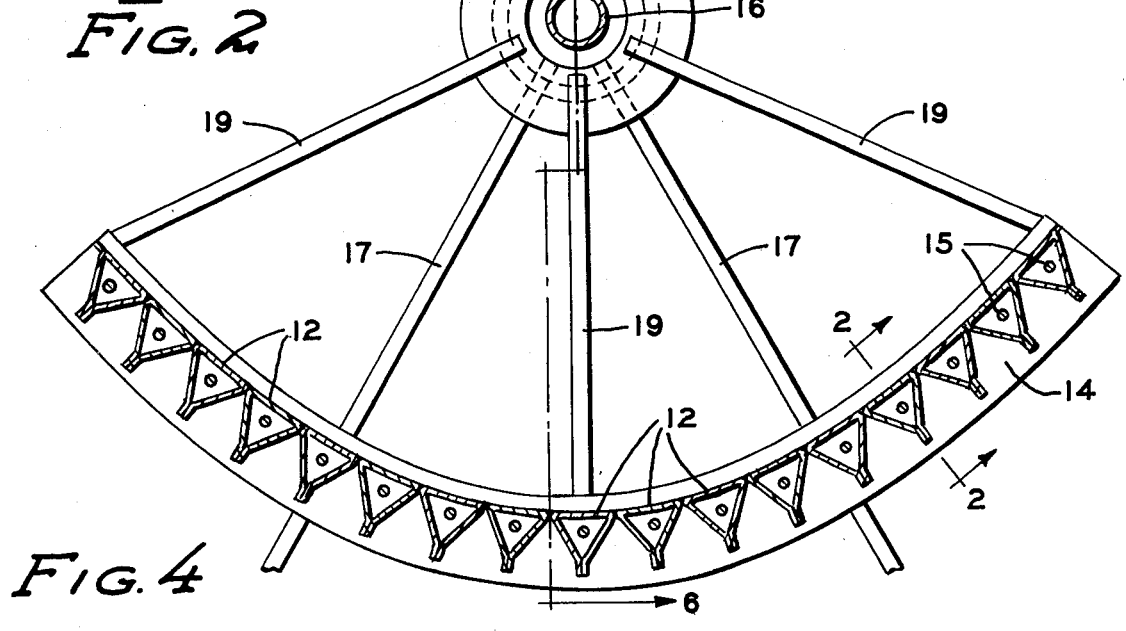
FIG. 4 is an enlarged sectional view of the collector of FIG. 1 taken approximately along line 4—4 of FIG. 1.

The shape and mounting of the member 12 is better shown in FIGS. 2 and 3. In FIG. 2, each member 12 is depicted as a generally triangular polygon shape formed from a single piece of sheet stock closed along an edge 20 and retained as by rivets or spot welds. The inwardly directed, normally upward facing surface 21 is shaped as a concave curvature which is preferably a segment of a generally parabolic curve. The surfaces 21 of the members 11 are treated as by coating, polishing or the like such that they ar highly reflective to solar radiation.

Figure 6:
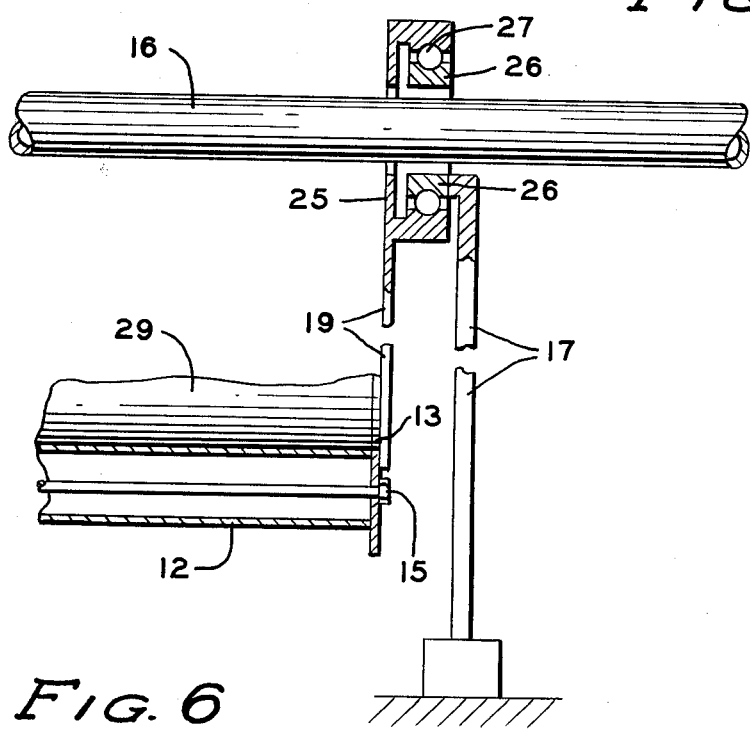
FIG. 6 is a sectional view taken along line 6—6 of FIG. 4.

The extremes of the sides of the polygon shapes 12 defining the surface 21 are provided wth protruding end tabs as at 22 which fit into corresponding slots 23 in the members 12 and 14 to fix the disposition of the members 12 relative thereto upon assembly. The tension rods 15 spanning the end plates 13 and 14 are held as by nuts 24 to complete the simple but rigid assembly. As more completely shown in FIG. 6, the bearing collar 18 may have an outer race 25 fixed to the struts 19 and an inner race 26 fixed to the supports 17 with anto-friction balls or rollers therebetween. Of course, other methods of mounting may be used.

The composite assembly of all the juxtaposed members 12 between end plates 13 and 14 produces the effect of a continuous trough made up of a plurality of surfaces 21. The composite shape of the trough is preferably, generally, parabolic such that solar radiation striking any of the highly reflective surface segments 21 will be reflected to focus on a line lying along the surface of a conduit member 16. The surface of the member 16 is preferably treated as by utilizing an absorbing paint coating or the like such that it is rendered highly absorbent to solar radiation. Thus, the solar radiation striking the area of the trough is reflected and concentrated on the surface of the conduit 15.

The concentrated solar heat is transferred to the wall of the member 16 to a heat transfer fluid circulated therein in conventional fashion. Normally, a plurality of such parabolic trough structures are manifolded together in a solar heating system.

The inherent strength imparted by the polygon shapes 12 allows the entire structure to be made of relatively thin stock material which reduces both the amount of material required in the overall weight of the trough structure. Light weight material such as aluminum may be used in the construction of the trough. Thus, a lightweight strong structure may be achieved which facilitates handling and repairing when necessary.

While better focussing of the solar radiation on the member 16 is achieved by making the curvature of each shape surface 21 a segment of an overall parabolic shape, the individual surfaces 21 need not be truly parabolic to provide generally adequate focussing upon the member 16. The faces 21 may be concave circular cylindric sections having a radius of curvature which permits approximate focussing of the solar energy on the receiver member 16.

Figure 5:
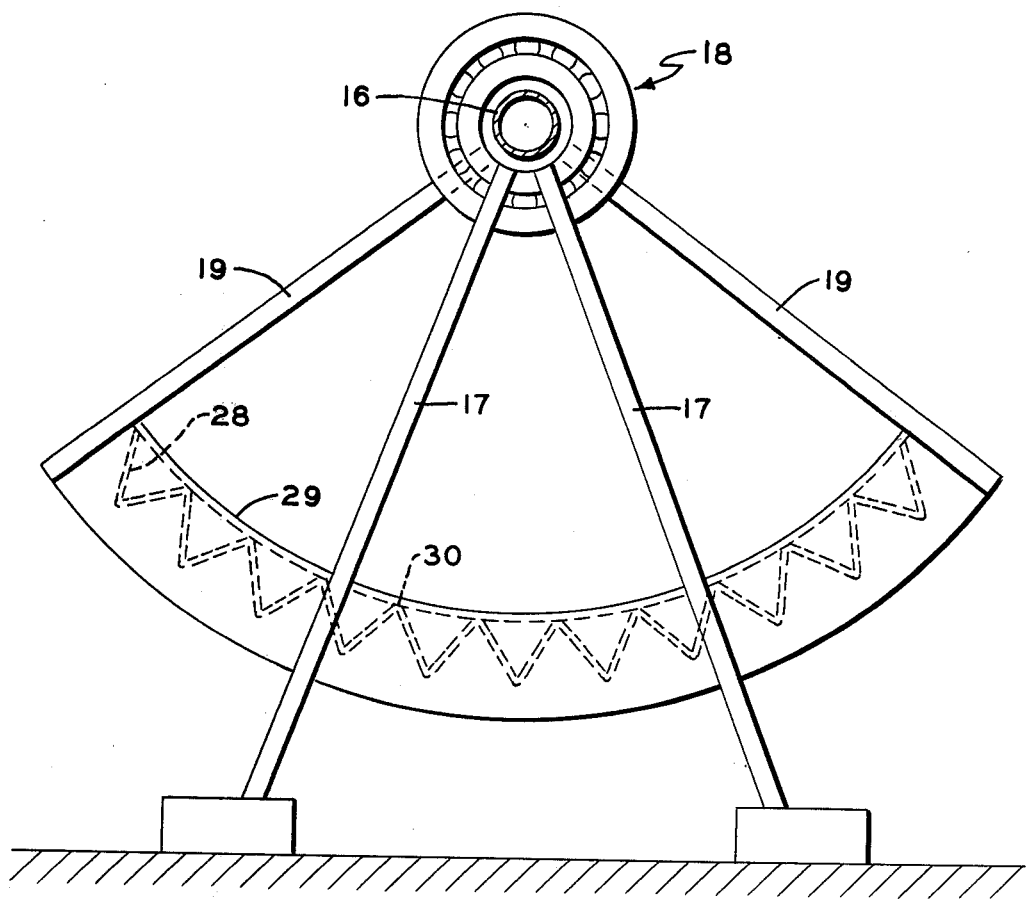
FIG. 5 is a sectional view of an alternate embodiment of the invention.

Also, while the shapes 12 are shown as generally triangular polygons in the preferred embodiment, other shapes may be used. In fact, as illustrated in the alternate embodiment of FIG. 5, a pleated or corrugated structural member 28 may be used in place of the plurality of polygons 11 in the first illustrated embodiment. The member 28 may be welded to both the flanges 13 and 14 curved to a general parabolic shape. A reflective member 29 is attached along the raised portions 30 to form the continuous reflective surface in the manner of the embodiment of FIGS. 1-4. The remainder of the structure may be substantially identical to that previously discussed in regard to FIGS. 1-4. The reflective surface of the member 26 may be of polished aluminum, relective coating of painted steel, or aluminum covered with an acrylic film having an aluminized surface such as acrylic film FEK 163 manufactured by Minnesota Mining & Manufacturing Company, St. Paul, Minnesota.

The embodiments of the invention in which an exclusive property or right is claimed are defined as follows:

1. A generally parabolic cylindrical trough solar concentrating collector comprising:
    a pair of oppositely disposed end support members:
    structural means spanning said support members said structural means comprising a plurality of juxtaposed, generally triangular elongate structural members each of which is provided with a concave side such that the concave sides together generate a generally parabolic trough-shaped surface;
    a radiant energy reflective surface on said concave generally parabolic trough such that radiant energy striking the concave surface is focussed on a line above said concave surface;
    elongated radiant energy receiving and absorbing conduit for containing a heat transfer fluid disposed along the focal line of said radiant energy;
    support means supporting trough from said end support members said support means including bearing means allowing free angular rotation of said trough means.

2. The apparatus of claim 1 wherein the surfaces of said concave sides of said elongated structural members are polished to reflect said radiant energy.

3. The apparatus of claim 1 further comprising alignment means on said end support member cooperating with alignment means on said elongate structural triangular members to align said concave sides to form said parabolic trough and tensioning means for securing said elongate structural members in said aligned position.

4. A generally parabolic cylindrical trough solar concentrating collector comprising:
    a pair of oppositely disposed end support members;
    structural means spanning said support members, said structural means comprising, a single corrugated structural sheet; a concave generally parabolic trough fixed to the inner pleats of the sheet corrugations;
    a radiant energy reflective surface on said concave generally parabolic trough such that radiant energy striking the concave surface is focussed on a line above said concave surface;
    elongated radiant energy receiving and absorbing conduit for containing a heat transfer fluid disposed along the focal line of said radiant energy;
    support means supporting said trough from said end support members said support means including bearing means allowing free angular rotation of said trough means.

* * * * *